United States Patent
Mizutani et al.

(10) Patent No.: US 10,784,911 B2
(45) Date of Patent: Sep. 22, 2020

(54) LOCAL OSCILLATION DEVICE AND ARRAY ANTENNA DEVICE

(71) Applicant: MITSUBISHI ELECTRIC CORPORATION, Tokyo (JP)

(72) Inventors: Hiroyuki Mizutani, Tokyo (JP); Hideyuki Nakamizo, Tokyo (JP); Kenichi Tajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/481,264

(22) PCT Filed: Jan. 11, 2018

(86) PCT No.: PCT/JP2018/000394
§ 371 (c)(1),
(2) Date: Jul. 26, 2019

(87) PCT Pub. No.: WO2018/150767
PCT Pub. Date: Aug. 23, 2018

(65) Prior Publication Data
US 2019/0393916 A1 Dec. 26, 2019

(30) Foreign Application Priority Data

Feb. 17, 2017 (WO) .................. PCT/JP2017/005822

(51) Int. Cl.
*H04B 1/30* (2006.01)
*H04B 7/08* (2006.01)
(52) U.S. Cl.
CPC ............. *H04B 1/30* (2013.01); *H04B 7/0837* (2013.01)
(58) Field of Classification Search
CPC ................................ H04B 1/30; H04B 7/0837
See application file for complete search history.

(56) References Cited

U.S. PATENT DOCUMENTS

2002/0061752 A1* 5/2002 Kurokami ............ H04B 7/0885
455/447
2006/0166638 A1* 7/2006 Iwaida ..................... H04B 1/26
455/318
(Continued)

FOREIGN PATENT DOCUMENTS

| JP | 2000-341188 A | 12/2000 |
| JP | 2005-244854 A | 9/2005 |
| JP | 5377750 B2 | 12/2013 |

OTHER PUBLICATIONS

International Search Report (PCT/ISA/210) issued in PCT/JP2018/000394, dated Mar. 13, 2018.

*Primary Examiner* — Nguyen T Vo
(74) *Attorney, Agent, or Firm* — Birch, Stewart, Kolasch & Birch, LLP

(57) ABSTRACT

A local oscillation device according to the present invention includes: a first local oscillator to output a first local oscillation wave synchronized with a reference signal, the first local oscillator being turned on/off on the basis of a control signal; a second local oscillator to output a second local oscillation wave synchronized with the reference signal and the same in frequency and phase as the first local oscillation wave, the second local oscillator being turned on/off on the basis of the control signal; and a path switching circuit coupled to the first local oscillator and the second local oscillator, the path switching circuit switching paths of the first local oscillation wave and the second local oscillation wave on the basis of the control signal or a signal synchronized with the control signal.

5 Claims, 6 Drawing Sheets

(56) References Cited

U.S. PATENT DOCUMENTS

2008/0132192 A1 6/2008 Lim
2012/0319746 A1 12/2012 Hayashi et al.

\* cited by examiner

LOCAL OSCILLATION DEVICE AND ARRAY ANTENNA DEVICE

TECHNICAL FIELD

The present invention relates to a local oscillation device and an array antenna device, each of which is used for wireless communication, radar, and the like.

BACKGROUND ART

In the related art, there is an increasing demand for increasing the speed and capacity in communication devices, and in response to this demand, development of beamforming technology is actively conducted in recent years aiming at increasing the speed by narrowing radio waves for specific users and thereby suppressing interference of radio waves. In order to perform beam forming, an array antenna in which a plurality of antennas is arranged is used.

As other technology for increasing the speed and capacity of communication, multi-level modulation has been developed, that is, technology for increasing the amount of information that can be transmitted to a user at one time. However, there is a disadvantage that the communication becomes susceptible to noise as the number of modulation levels increases, and thus the problem is to improve the signal-to-noise ratio.

As one of the configurations for improving the signal-to-noise ratio, Patent Literature 1 describes a configuration in which an independent local oscillator is provided for each of a plurality of transmitters or receivers that are included in an array antenna. Since the noise components (phase noise) included in local oscillation waves output from the independent local oscillators are independent of one another, a desired signal component is subjected to amplitude synthesis when the signals output from the plurality of transmitters or receivers are synthesized, whereas noise components are subjected to power synthesis. Therefore, the phase noise characteristic of signal is improved, and the signal-to-noise ratio is improved as compared with a configuration using a single local oscillator.

CITATION LIST

Patent Literature

Patent Literature 1: JP 5377750 B2

SUMMARY OF INVENTION

Technical Problem

In addition to increasing the speed and capacity, reducing the power consumption is required for communication devices. Since the configuration described in Patent Literature 1 uses the plurality of local oscillators, there is a disadvantage that the power consumption increases as the number of local oscillators increases.

There is a limit to the amount of information that can be simultaneously transmitted and received from one communication device. For example, in a case where there are a small number of users around a communication device, the communication speed per user can be increased by increasing the number of modulation levels. In this case, the signal-to-noise ratio requirement for the communication device becomes higher. Conversely, in a case where there are a large number of users around the communication device, the communication speed per user has to be reduced by reducing the number of modulation levels. In this case, the signal-to-noise ratio requirement for the communication device becomes lower.

In the case where the configuration described in Patent Literature 1 is used, the plurality of local oscillators is all operating regardless of a change in the signal-to-noise ratio requirement corresponding to the surrounding situation of the communication device. Therefore, there is a disadvantage that excessive performance is exercised during operation while high power consumption is maintained in a case where the signal-to-noise ratio requirement is low.

The present invention is intended to solve the above-mentioned disadvantages, and an object of the present invention is to obtain an array antenna capable of changing the power consumption of a local oscillation device depending on a change in the signal-to-noise ratio requirement corresponding to the surrounding situation of a communication device.

Solution to Problem

A local oscillation device according to the present invention includes: a first local oscillator to output a first local oscillation wave synchronized with a reference signal, and the first local oscillator being turned on/off on the basis of a control signal; a second local oscillator to output a second local oscillation wave synchronized with the reference signal and the same in frequency and phase as the first local oscillation wave, the second local oscillator being turned on/off on the basis of the control signal; and a path switching circuit for switching paths of the first local oscillation wave and the second local oscillation wave on the basis of the control signal or a signal synchronized with the control signal, the path switching circuit coupled to the first local oscillator and the second local oscillator.

Advantageous Effects of Invention

According to the present invention, it is possible to change the power consumption of a local oscillation device depending on a change in the signal-to-noise ratio requirement.

DESCRIPTION OF EMBODIMENTS

First Embodiment

Figure 1:
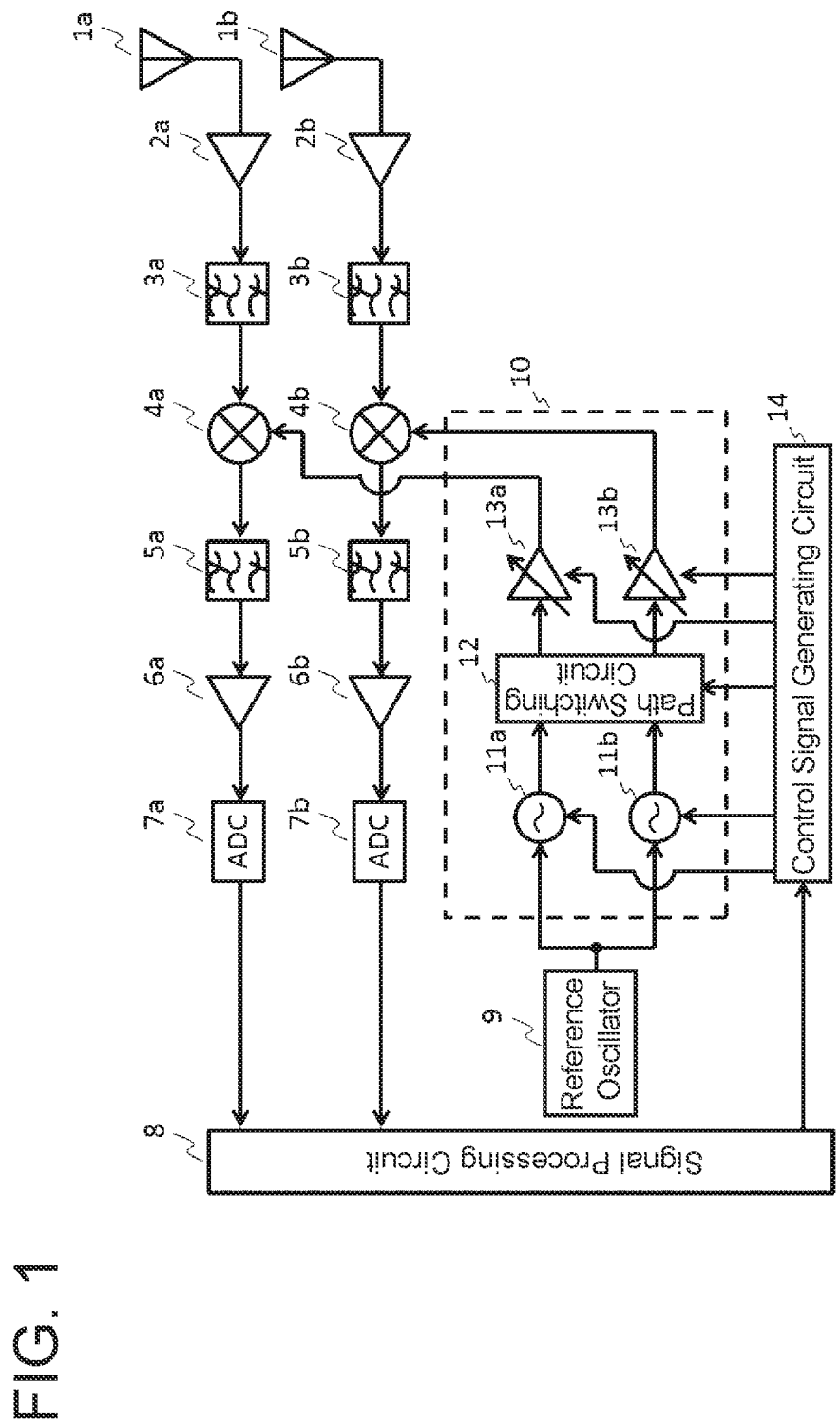
FIG. 1 is a configuration diagram illustrating an exemplary configuration of an array antenna device according to a first embodiment of the present invention.

FIG. 1 is a configuration diagram illustrating an exemplary configuration of an array antenna device according to a first embodiment of the present invention.

The array antenna includes antennas 1a and 1b, low-noise amplifiers 2a and 2b, filters 3a and 3b, mixers 4a and 4b, filters 5a and 5b, amplifiers 6a and 6b, analog-to-digital converters (ADCs) 7a and 7b (an example of analog-to-digital converters), a signal processing circuit 8, a reference oscillator 9, a local oscillation wave generating circuit 10, and a control signal generating circuit 14.

The local oscillation wave generating circuit 10 includes local oscillators 11a and 11b, a path switching circuit 12, and variable gain amplifiers 13a and 13b.

The antennas 1a and 1b receive radio waves. The antennas 1a and 1b receive a radio wave transmitted by a user and output the radio wave to the low-noise amplifiers 2a and 2b, respectively. As the antennas 1a and 1b, for example, a dipole antenna, a patch antenna, or the like is used.

The low-noise amplifiers 2a and 2b each amplify a signal with low noise. The low-noise amplifiers 2a and 2b amplify the signals received by the antennas 1a and 1b with low noise and output the amplified signals to the filters 3a and 3b, respectively. As the low-noise amplifiers 2a and 2b, for example, an integrated circuit (IC) obtained by integrating gallium arsenide (GaAs), silicon germanium (SiGe), or a complementary metal oxide semiconductor (CMOS) by a semiconductor process or a hybrid IC in which components such as transistors, resistors, and capacitors are mounted on a substrate is used. Note that the low-noise amplifiers 2a and 2b may be variable gain amplifiers capable of changing the gain for amplifying the signal.

The filters 3a and 3b remove unwanted waves included in the input signal and allow desired waves to pass therethrough. The filters 3a and 3b remove unwanted waves included in the signals output from the low-noise amplifiers 2a and 2b, pass desired waves, and output the desired waves to the mixers 4a and 4b, respectively. As the filters 3a and 3b, for example, a band pass filter, a band-rejection filter, a low-pass filter, a high-pass filter, or the like is used. Note that the filters 3a and 3b may be variable filters capable of changing the signal band in which it is passed or eliminated.

The mixers 4a and 4b mix a signal and a local oscillation wave and output the mixed wave. The mixers 4a and 4b mix the signals output from the filters 3a and 3b with the local oscillation waves output from the local oscillation wave generating circuit 10, and output the mixed waves to the filters 5a and 5b, respectively. As the mixers 4a and 4b, for example, a diode mixer using a diode, a field effect transistor (FET) mixer using a FET, or the like is used.

The filters 5a and 5b remove unwanted waves included in the input signal and allow desired waves to pass therethrough. The filters 5a and 5b remove unwanted waves included in the signals output from the mixers 4a and 4b, allow desired waves to pass therethrough, and output the desired waves to the amplifiers 6a and 6b, respectively. As the filters 5a and 5b, for example, a band pass filter, a band-rejection filter, a low-pass filter, a high-pass filter, or the like is used. Note that the filters 5a and 5b may be variable filters capable of changing the signal band in which it is passed or eliminated.

The amplifiers 6a and 6b each amplify a signal. The amplifiers 6a and 6b amplify the signals output from the filters 5a and 5b and output the amplified signals to the ADCs 7a and 7b, respectively. As the amplifiers 6a and 6b, for example, an IC obtained by integrating GaAs, SiGe, or a CMOS by a semiconductor process or a hybrid IC in which components such as transistors, resistors, and capacitors are mounted on a substrate is used. Note that the amplifiers 6a and 6b may be variable gain amplifiers capable of changing the gain for amplifying the signal.

The ADCs 7a and 7b convert analog signals into digital signals. The ADCs 7a and 7b convert analog signals output from the amplifiers 6a and 6b into digital signals, respectively. As the ADCs 7a and 7b, for example, an ADC of successive approximation type, a pipeline type, a delta-sigma type, etc. is used.

The signal processing circuit 8 obtains necessary information by calculation from input digital signals. The signal processing circuit 8 obtains information included in the radio wave transmitted by the user from the digital signals output from the ADCs 7a and 7b by calculation. In addition, a state switching signal for switching the state of the local oscillation wave generating circuit 10 is output to the control signal generating circuit 14 depending on whether the information has been correctly obtained. Here, the state of the local oscillation wave generating circuit 10 refers to the state illustrated in FIG. 2 which will be described later, that is, a state representing a combination of ON/OFF of the power source of the local oscillators 11a and 11b, the output destination of the local oscillation waves output by the local oscillators 11a and 11b, and the gains of the variable gain amplifiers 13a and 13b included in the local oscillation wave generating circuit 10. For example, the signal processing circuit 8 includes a field programmable gate array (FPGA), an application specific integrated circuit (ASIC), a logic operation circuit, and the like.

The reference oscillator 9 outputs a reference signal. The reference oscillator 9 outputs a reference signal for synchronization of the plurality of local oscillators 11a and 11b. As the reference oscillator 9, for example, a quartz oscillator, a micro electro mechanical systems (MEMS) oscillator, or the like is used.

The local oscillation wave generating circuit 10 outputs a local oscillation wave to the mixers 4a and 4b. The local oscillation wave generating circuit 10 includes a local oscillator 11a, a local oscillator 11b, a path switching circuit 12, a variable gain amplifier 13a, and a variable gain amplifier 13b. The local oscillation wave generating circuit 10 is synchronized with the reference signal output from the reference oscillator 9 and, on the basis of a plurality of control signals output from the control signal generating circuit 14 depending on a change in the signal-to-noise ratio requirement for the array antenna, controls ON/OFF of the power source of the local oscillators 11a and 11b, the output destination of the local oscillation waves output from the local oscillators 11a and 11b, and the gains of the variable gain amplifiers 13a and 13b.

The local oscillators 11a and 11b output local oscillation waves to the mixers 4a and 4b via the path switching circuit 12. The local oscillators 11a and 11b turn on/off the power source on the basis of a power control signal output from the control signal generating circuit 14, are synchronized with the reference signal output from the reference oscillator 9, and output, to the path switching circuit 12, the local oscillation waves for the mixers 4a and 4b. Here, the two local oscillation waves output from the local oscillators 11a and 11b both include a signal component and a noise component. Of these, the signal components of the two local oscillation waves are the same in frequency and phase as each other. On the other hand, the noise components are random components independent from each other. That is, a signal component of a local oscillation wave output by the local oscillator 11a and a signal component of a local oscillation wave output by the local oscillator 11b are in a coherent relationship with each other, whereas a noise component of the local oscillation wave output by the local oscillator 11a and a noise component of the local oscillation wave output from the local oscillator 11b are in an incoherent relationship with each other.

Note that the power control signal may be a signal for controlling ON/OFF of the power source of the local oscillators 11a and 11b, or a signal for controlling whether power is supplied to local oscillators 11a and 11b. That is, (1) a power source circuit may be included in the local oscillators 11a and 11b to allow "power control signal=signal for controlling ON/OFF of power source," or (2) a power source circuit may be included in the control signal generating circuit 14 to allow "power control signal=voltage for driving the local oscillators 11a and 11b" to enable ON/OFF control of the local oscillators 11a and 11b. As the local oscillators 11a and 11b, for example, a phase locked loop (PLL), a direct digital synthesizer (DDS), or the like is used.

The path switching circuit 12 switches paths of the local oscillation waves output from the local oscillators 11a and 11b. The path switching circuit 12 switches the paths on the basis of a path control signal output from the control signal generating circuit 14 to change output destinations of the local oscillation waves. For example, the path switching circuit 12 includes a switch, a signal distributor, a signal synthesizer, and the like.

The variable gain amplifiers 13a and 13b change the gain on the basis of the control signal output from the control signal generating circuit 14 and amplify input signals. The variable gain amplifiers 13a and 13b amplify the signal output from the path switching circuit 12 with gain corresponding to the gain control signal output from the control signal generating circuit 14 and output the amplified signal to the mixers 4a and 4b, respectively. As the variable gain amplifiers 13a and 13b, for example, an IC obtained by integrating GaAs, SiGe, or a CMOS by a semiconductor process or a hybrid IC in which components such as transistors, resistors, and capacitors are mounted on a substrate is used.

The control signal generating circuit 14 generates a control signal on the basis of a signal output from the signal processing circuit 8. The control signal generating circuit 14 outputs a plurality of control signals for controlling the operation of the local oscillation wave generating circuit 10 to the local oscillation wave generating circuit 10 on the basis of the state switching signal output from the signal processing circuit 8. Specifically, the control signal generating circuit 14 outputs a power control signal to the local oscillators 11a and 11b to change ON/OFF of the power source of the local oscillators 11a and 11b. The control signal generating circuit 14 further outputs a path control signal to the path switching circuit 12 to switch the paths of the local oscillation waves output from the local oscillators 11a and 11b. The control signal generating circuit 14 also outputs the gain control signal to the variable gain amplifiers 13a and 13b to change the gain. For example, the control signal generating circuit 14 includes an FPGA, an ASIC, a logical operation circuit, and the like.

Next, the operation of the array antenna according to the first embodiment of the present invention will be described.

The antennas 1a and 1b receive a pilot signal (signal of a determined pattern) transmitted by a user and output the signal to the low-noise amplifiers 2a and 2b, respectively.

The low-noise amplifiers 2a and 2b amplify the signals received by the antennas 1a and 1b with low noise and output the amplified signals to the filters 3a and 3b, respectively. The filters 3a and 3b remove unwanted waves included in the signals output from the low-noise amplifiers 2a and 2b, allow desired waves to pass therethrough, and output the desired waves to the mixers 4a and 4b, respectively.

The mixers 4a and 4b mix the signals output from the filters 3a and 3b with the local oscillation waves output from the local oscillation wave generating circuit 10, and output the mixed waves to the filters 5a and 5b, respectively. The filters 5a and 5b remove unwanted waves included in the signals output from the mixers 4a and 4b, allow desired waves to pass therethrough, and output the desired waves to the amplifiers 6a and 6b, respectively.

The amplifiers 6a and 6b amplify the signals output from the filters 5 and 5b and output the amplified signals to the ADCs 7a and 7b, respectively. The ADCs 7a and 7b convert the analog signals output from the amplifiers 6a and 6b into digital signals, respectively. The signal processing circuit 8 obtains information included in the radio wave transmitted by the user from the digital signals output from the ADCs 7a and 7b by calculation.

Meanwhile, the reference oscillator 9 outputs a reference signal to the local oscillation wave generating circuit 10. The local oscillation wave generating circuit 10 is synchronized with the reference signal output from the reference oscillator 9 and outputs local oscillation waves having the same frequency and phase to the mixers 4a and 4b. Depending on whether a target signal-to-noise ratio is satisfied as a final processing result of the pilot signal transmitted by the user in the signal processing circuit 8, the signal processing circuit 8 outputs a state switching signal for switching the state of the local oscillation wave generating circuit 10 to the control signal generating circuit 14.

The control signal generating circuit 14 outputs a plurality of control signals for controlling the operation of the local oscillation wave generating circuit 10 to the local oscillation wave generating circuit 10 on the basis of the state switching signal output from the signal processing circuit 8. Specifically, the control signal generating circuit 14 controls ON/OFF of the power source of the local oscillators 11a and 11b by outputting a power control signal to the local oscillators 11a and 11b, switches the paths of the local oscillation waves by outputting a path control signal to the path switching circuit 12, and changes the gains of the variable gain amplifiers 13a and 13 by outputting a gain control signal to the variable gain amplifiers 13a and 13. These control signals are, for example, all digital signals; however, the control signals may be analog signals.

FIG. 2 is a diagram illustrating the state of a local oscillation wave generating circuit 10 included in the array antenna device according to the first embodiment of the present invention. In FIGS. 2A and 2B, the path switching circuit 12 includes a signal distributor 15 and a switch 16.

Figure 2A:
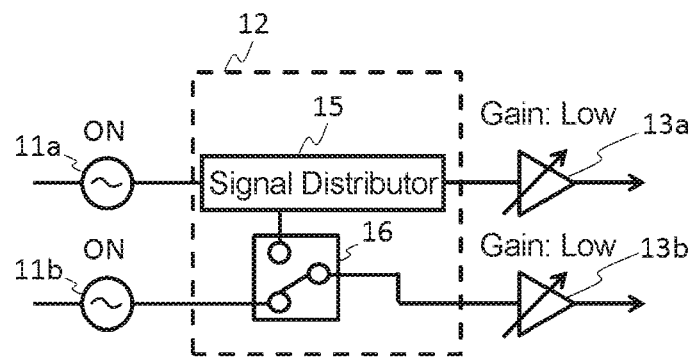
FIG. 2 is a diagram illustrating the state of a local oscillation wave generating circuit 10 included in the array antenna device according to the first embodiment of the present invention.

FIG. 2A is a diagram illustrating one of the states of the local oscillation wave generating circuit 10. The local oscillators 11a and 11b are both powered on. The path switching circuit 12 couples the local oscillator 11a to the variable gain amplifier 13a and the local oscillator 11b to the variable gain amplifier 13b by causing the switch 16 to choose the local oscillator 11b. In this example, the variable gain amplifiers 13a and 13b both have gains lower than those in FIG. 2B.

Figure 2B:
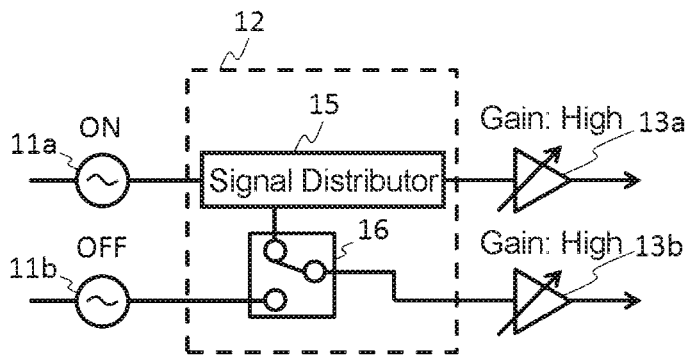

The state illustrated in FIG. 2A is used in a case where the signal-to-noise ratio requirement is high. For example, the state is used when there are a small number of users around the communication device and the number of modulation levels is increased in order to increase the communication speed per user. In this case, the local oscillators 11a and 11b each output local oscillation waves having random components in which signal components are the same in frequency and phase as each other but noise components are independent from each other, and thus noise components included in the digital signals output from the ADCs 7a and 7b become independent random components. Therefore, the signal-to-noise ratio, which is a ratio of signal components to noise components obtained after the reception digital signals output from the ADCs 7a and 7b are integrated by the signal processing circuit 8, can be improved by 3 dB as compared to the configuration in which a single local oscillator is used as illustrated in FIG. 2B. That is, since the signal components included in the digital signals output from the ADCs 7a and 7b are coherently synthesized, whereas the noise components are incoherently synthesized, the signal-to-noise ratio can be improved by 3 dB.

FIG. 2B is a diagram illustrating another state of the local oscillation wave generating circuit 10. Of the local oscillators 11a and 11b, the local oscillator 11a is powered on, whereas the local oscillator 11b is powered off. The path switching circuit 12 couples the local oscillator 11a to both the variable gain amplifier 13a and the variable gain amplifier 13b and causes the local oscillator 11b to be in an open state by switching the switch 16 to the local oscillator 11a side. In this example, the variable gain amplifiers 13a and 13b both have gains higher than those in FIG. 2A.

The state illustrated in FIG. 2B is used in a case where the signal-to-noise ratio requirement is low. For example, the state is used when there are a large number of users around the communication device and the number of modulation levels is reduced in order to distribute limited resources and to reduce the communication speed per user. In this case, by outputting a local oscillation wave from the local oscillator 11a, it can suppress the power consumption for driving the local oscillator 11b while performing the operation with the minimum necessary signal-to-noise ratio. Note that in the state illustrated in FIG. 2B, the local oscillation wave output from the local oscillator 11a is distributed and output to the two variable gain amplifiers 13a and 13b, and thus the power of the local oscillation wave input to each of the variable gain amplifiers becomes half of that in the state illustrated in FIG. 2A. Therefore, the gains of the two variable gain amplifiers 13a and 13b are set to be 3 dB higher than that in FIG. 2A.

Figure 2C:
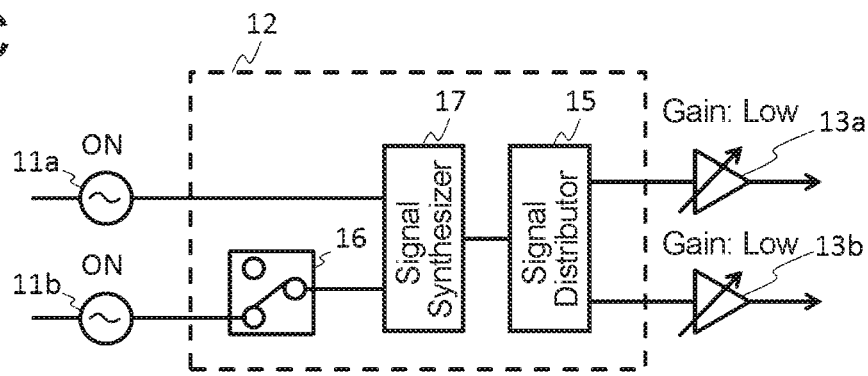

In a case where a circuit illustrated in FIG. 2C is used instead of that in FIG. 2A, similar effects to those of FIG. 2A can be obtained. In FIG. 2C, a path switching circuit 12 includes a signal distributor 15, a switch 16, and a signal synthesizer 17. The switch 16 coupled to the local oscillator 11b switches the path to the signal synthesizer 17 side. Since the local oscillators 11a and 11b each output local oscillation waves having random components in which signal components are the same in frequency and phase as each other but noise components are independent from each other, the signal-to-noise ratio of reception signals can be improved like in the case of FIG. 2A.

Figure 2D:
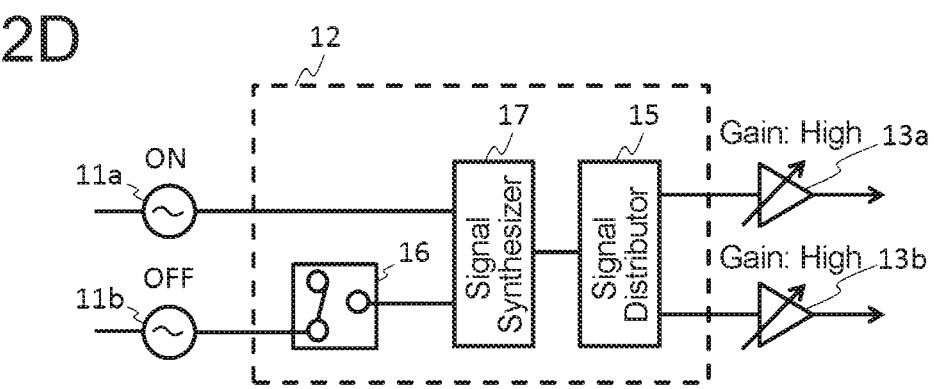

In a case where a circuit illustrated in FIG. 2D is used instead of that in FIG. 2B, similar effects to those of FIG. 2B can be obtained. In FIG. 2D, since the switch 16 is not switched to the signal synthesizer 17 side, only the local oscillation wave output from the local oscillator 11a is input to the signal synthesizer 17. In this case, since no power is supplied to the local oscillator 11b, the power consumption for driving the local oscillator 11b can be suppressed. Note that although the case where the switch 16 is a single pole dual throw (SPDT) switch has been described, two single pole single throw (SPST) switches may be used as long as the two states can be switched.

Next, a procedure for switching the state of the local oscillation wave generating circuit 10 illustrated in FIG. 2 will be described.

First, it is assumed that the local oscillation wave generating circuit 10 is in the state of FIG. 2A. In a case where a target signal-to-noise ratio is satisfied as a final processing result by the signal processing circuit 8 of a pilot signal received by the antennas 1a and 1b, the signal processing circuit 8 outputs a state switching signal for switching from the state of FIG. 2A to the state of FIG. 2B to the control signal generating circuit 14.

The control signal generating circuit 14 outputs a power control signal, a path control signal, and a gain control signal to the local oscillators 11a and 11b, the path switching circuit 12, and the variable gain amplifier 13, respectively, to switch the state from the state of 2A to the state of FIG. 2B.

In the state of FIG. 2B, in a case where a target signal-to-noise ratio is satisfied as a final processing result by the signal processing circuit 8 of a pilot signal received by the antennas 1a and 1b, the state of FIG. 2B is maintained, and the communication is started after causing the array antenna device to operate in a low power consumption state.

Conversely, when the target signal-to-noise ratio is not satisfied, a state switching signal for returning it to the state of FIG. 2A from the state of FIG. 2B is output to the control signal generating circuit 14, and the communication is started while the state of FIG. 2A is maintained thereafter.

As described above, according to the first embodiment, since ON/OFF of the power source of the local oscillators 11a and 11b, the output destination of the local oscillation waves output from the local oscillators 11a and 11b, and the gains of the variable gain amplifiers 13a and 13b included in the local oscillation wave generating circuit 10 are changed on the basis of the signal-to-noise ratio requirement, the power consumption of the local oscillation wave generating circuit 10 can be changed on the basis of a change in the signal-to-noise ratio requirement.

Note that in the above description the case of two antennas (antennas 1a and 1b) for receiving signals has been described; however, N antennas may be used. When N antennas are used, it is necessary to use N local oscillators as well. Also in this case, it is possible to operate the plurality of local oscillators with the minimum necessary power consumption by adaptively changing the number of local oscillators used on the basis of the signal-to-noise ratio requirement.

In the above description, the configuration using filters, amplifiers, and ADCs as many as the number of antennas has been described; however the output of the mixers may be synthesized, and only a single filter, a single amplifier, and a single ADC may be used. Likewise, the output of filters may be synthesized, or the output of amplifiers may be synthesized. In any of the configurations, the plurality of local oscillators can be operated with the minimum necessary power consumption by adaptively changing the number of local oscillators to be used.

Second Embodiment

In the first embodiment, the optimization of the power consumption in the local oscillation wave generating circuit used in the receiver has been described. In a second embodiment, optimization of power consumption of a local oscillation wave generating circuit used in a transmitter will be described.

Figure 3:
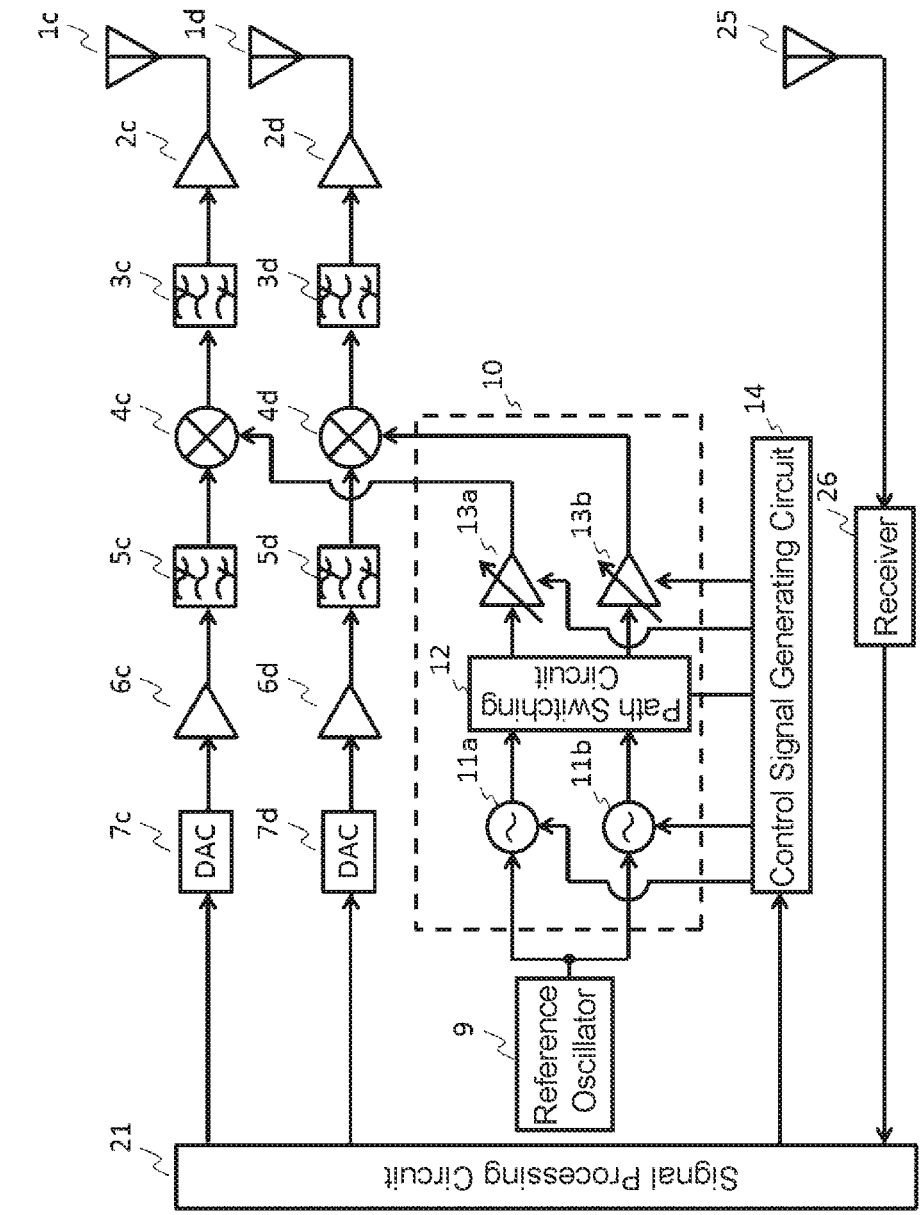
FIG. 3 is a configuration diagram illustrating an exemplary configuration of an array antenna device according to a second embodiment of the present invention.

FIG. 3 is a configuration diagram illustrating an exemplary configuration of an array antenna device according to the second embodiment of the present invention. In FIG. 3, the same symbols as those in FIG. 1 denote the same or corresponding parts. The array antenna includes transmission antennas 1c and 1d, high-power amplifiers 2c and 2d, filters 3c and 3d, mixers 4c and 4d, filters 5c and 5d, amplifiers 6c and 6d, digital-to-analog converters (DACs) 7c and 7d (an example of digital-to-analog converters), a signal processing circuit 21, a reference oscillator 9, a local oscillation wave generating circuit 10, a control signal generating circuit 14, a receiving antenna 25, and a receiver 26.

In FIG. 3, although there is a difference between a transmitter and a receiver, the transmission antennas 1c and 1d, the high-power amplifiers 2c and 2d, the filters 3c and 3d, the mixers 4c and 4d, the filters 5c and 5d, and the amplifiers 6c and 6d correspond to the antennas 1a and 1b, the low-noise amplifiers 2a and 2b, the filters 3a and 3b, the mixers 4a and 4b, the filters 5a and 5b, and the amplifiers 6a and 6b in FIG. 1, respectively.

The signal processing circuit 21 outputs digital signals by calculation and obtains necessary information from an input digital signal by calculation. The signal processing circuit 21 outputs a signal to be transmitted to a user as a digital signal to the DACs 7c and 7d. Moreover, information included in a radio wave transmitted by the user is obtained from a digital signal output from the receiver 26 by calculation. In addition, a state switching signal for switching the state of the local oscillation wave generating circuit 10 is output to the control signal generating circuit 14 depending on whether the information has been correctly obtained. For example, the signal processing circuit 21 includes an FPGA, an ASIC, a logical operation circuit, and the like.

The DACs 7c and 7d convert digital signals into analog signals. The DACs 7c and 7d convert the digital signals output from the signal processing circuit 21 into analog signals and output the analog signals to the amplifiers 6c and 6d, respectively. As the DACs 7c and 7d, for example, a DAC of resistor ladder type, a current output type, a delta-sigma type, etc. is used.

The receiving antenna 25 receives radio waves. The receiving antenna 25 receives a radio wave transmitted by a user and outputs the radio wave to the receiver 26. As the receiving antenna 25, for example, a dipole antenna, a patch antenna, or the like is used. The receiving antenna 25 may be the same antenna as the antennas 1a and 1b illustrated in FIG. 1.

The receiver 26 amplifies an input signal, removes unwanted waves included in the signal, converts the frequency of the signal into a frequency that can be processed by the signal processing circuit, and converts the signal into a digital signal. The receiver 26 amplifies a signal received by the receiving antenna 25, removes unwanted waves included in the signal, converts the frequency of the signal into a frequency that can be processed by the signal processing circuit 21, converts the signal into a digital signal, and outputs the digital signal to the signal processing circuit 21. Note that, as the receiver 26, the receiver including the antennas 1a and 1b to the ADCs 7a and 7b, the reference oscillator 9, and the local oscillation wave generating circuit 10 illustrated in FIG. 1 may be used. Moreover, a single local oscillator may be used instead of the local oscillation wave generating circuit 10. Although in FIG. 3 a single receiving antenna 25 and a single receiver 26 are used; however, N receiving antennas 25 and N receivers 26 may be used.

Next, the operation of the array antenna device according to the second embodiment of the present invention will be described.

The signal processing circuit 21 outputs a pilot signal to be transmitted to a user as a digital signal to the DACs 7c and 7d. The DACs 22 convert the digital signals output from the signal processing circuit 21 into analog signals and output the analog signals to the amplifiers 6c and 6d. The amplifiers 6c and 6d amplify the signals output from the DACs 7c and 7d and output the amplified signals to the filters 5c and 5d, respectively.

The filters 5c and 5d remove unwanted waves included in the signals output from the amplifiers 6c and 6d, allow desired waves to pass therethrough, and output the desired waves to the mixers 4c and 4d, respectively.

The mixers 4c and 4d mix the signals output from the filters 5c and 5d with the local oscillation waves output from the local oscillation wave generating circuit 10, and output the mixed waves to the filters 3c and 3d, respectively.

The filters 3c and 3d remove unwanted waves included in the signals output from the mixers 4c and 4d, allow desired waves to pass therethrough, and output the desired waves to the high-power amplifiers 2c and 2d, respectively.

The high-power amplifiers 2c and 2d amplify the signals output from the filters 3c and 3d and output the amplified signals to the transmission antennas 1c and 1d, respectively. The transmission antennas 1c and 1d transmit the signals output from the high-power amplifiers 2c and 2d, respectively, to the user as radio waves.

The user receives the pilot signal transmitted by the transmission antennas 1c and 1d, determines whether a desired communication quality has been obtained, and transmits a response signal including this result to the receiving antenna 25.

The receiving antenna 25 receives the response signal transmitted by the user and outputs the response signal to the receiver 26. The receiver 26 amplifies the response signal received by the receiving antenna 25, removes unwanted waves included in the signal, converts the frequency of the signal into a frequency that can be processed by the signal processing circuit 21, converts the signal into a digital signal, and outputs the digital signal to the signal processing circuit 21.

The signal processing circuit 21 reads the content of the response signal from the digital signal output from the receiver 26 and outputs a state switching signal for switching the state of the local oscillation wave generating circuit 10 to the control signal generating circuit 14 depending on whether the desired communication quality has been obtained. For example, the signal processing circuit 21 determines whether the user has correctly received the signal from whether the value of a specific bit is "1" or "0" in a digital bit string obtained by demodulating the response signal. In this example, the state switching signal refers to a signal for switching the state illustrated in FIG. 2. That is, a signal for switching a state representing a combination of ON/OFF of the power source of the local oscillators 11a and 11b, the output destination of the local oscillation waves output by the local oscillators 11a and 11b, and the gains of the variable gain amplifiers 13a and 13b included in the local oscillation wave generating circuit 10. For example, the state switching signal is a 1-bit digital signal, and "HIGH" indicates the state of FIG. 2A, and "LOW" indicates the state of FIG. 2B.

The control signal generating circuit 14 outputs a plurality of control signals for controlling the state of the local oscillation wave generating circuit 10 to the local oscillation wave generating circuit 10 on the basis of the state switching signal output from the signal processing circuit 21.

First, it is assumed that the local oscillation wave generating circuit 10 is in the state of FIG. 2A. In a case where the user receives a pilot signal transmitted by the transmission antennas 1c and 1d and a desired communication quality is obtained, the signal processing circuit 21 outputs a state switching signal for switching from the state of FIG. 2A to the state of FIG. 2B to the control signal generating circuit 14.

The control signal generating circuit 14 outputs a power control signal, a path control signal, and a gain control signal to the local oscillators 11a and 11b, the path switching circuit 12, and the variable gain amplifiers 13a and 13b, respectively, to switch the state from the state of 2A to the state of FIG. 2B.

In case where the desired communication quality is obtained as a result of the user receiving the pilot signal transmitted by the transmission antennas 1c and 1d in the state of FIG. 2B, the state of FIG. 2B is maintained, and the communication is started after causing the array antenna device to operate in a low power consumption state.

Conversely, when the desired communication quality cannot be obtained, a state switching signal for returning to the state of FIG. 2A from the state of FIG. 2B is output to the control signal generating circuit 14, and the communication is started while the state of FIG. 2A is maintained thereafter.

As described above, according to the second embodiment, since ON/OFF of the power source of the local oscillators 11a and 11b, the output destination of the local oscillation waves output from the local oscillators 11a and 11b, and the gains of the variable gain amplifiers 13a and 13b included in the local oscillation wave generating circuit 10 are changed in accordance with the signal-to-noise ratio requirement for signals transmitted from the transmission antennas 1c and 1d to the user, the plurality of local oscillators (local oscillators 11a and 11b) can be operated with the minimum necessary power consumption on the basis of a change in the signal-to-noise ratio requirement.

Note that in the above description the case of two transmission antennas has been described; however, N antennas may be used. When N antennas 1 are used, it is necessary to use N local oscillators as well. Also in this case, by adaptively changing the number of local oscillators used on the basis of the signal-to-noise ratio requirements, it is possible to obtain an array antenna that operates a plurality of local oscillators with the minimum necessary power consumption.

In the above description, the configuration using DACs, amplifiers, and filters as many as the number of transmission antennas has been described; however, the output of a single DAC may be distributed to a plurality of amplifiers. Likewise, only a single DAC and a single amplifier may be used, and the output of the amplifier may be distributed to a plurality of filters, or only a single DAC, a single amplifier, and a single filter may be used, and the output of the filter may be distributed to a plurality of mixers. In either configuration, a plurality of local oscillators can be operated with the minimum power consumption by adaptively changing the number of local oscillators used.

Third Embodiment

In the first embodiment and the second embodiment, the array antennas have been described in which the local oscillation wave generating circuits 10 as many as the number of antennas 1 are implemented by arranging the local oscillators 11 as many as the number of antennas 1 and the plurality of local oscillators is operated with the minimum necessary power consumption on the basis of the signal-to-noise ratio requirement. In a third embodiment described is a configuration for implementing the state of a local oscillation wave generating circuit for high-speed communication with a higher signal-to-noise ratio requirement by arranging more local oscillators than the number of antennas 1.

Figure 4:
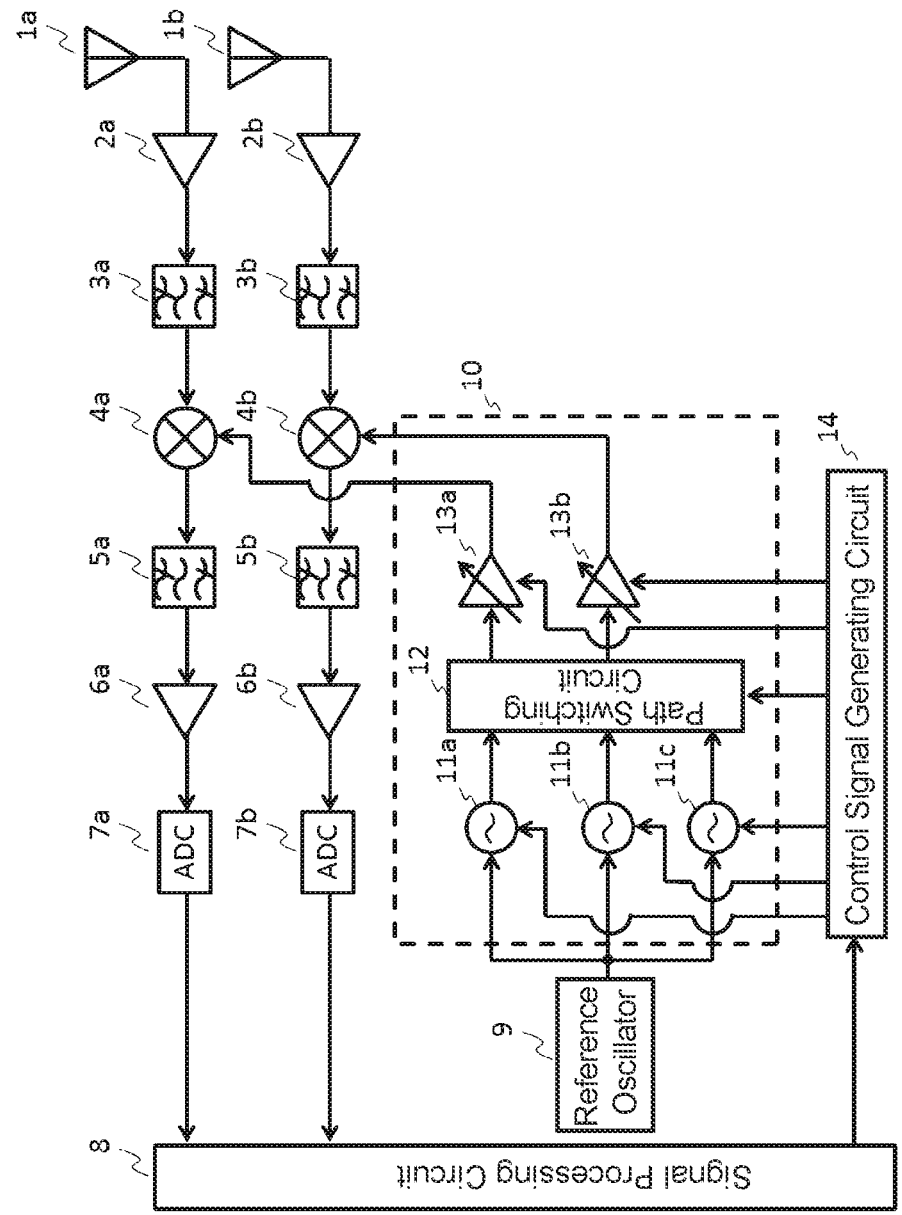
FIG. 4 is a configuration diagram illustrating an exemplary configuration of an array antenna device according to a third embodiment of the present invention.

FIG. 4 is a configuration diagram illustrating an exemplary configuration of an array antenna device according to the third embodiment of the present invention. In FIG. 4, the same symbols as those in FIGS. 1 to 3 denote the same or corresponding parts. Like in FIG. 1, the array antenna includes antennas 1a and 1b, low-noise amplifiers 2a and 2b, filters 3a and 3b, mixers 4a and 4b, filters 5a and 5b, amplifiers 6a and 6b, ADCs 7a and 7b, a signal processing circuit 8, a reference oscillator 9, a local oscillation wave generating circuit 10, and a control signal generating circuit 14. The local oscillation wave generating circuit 10 includes local oscillators 11a, 11b, and 11c, a path switching circuit 12, and variable gain amplifiers 13a and 13b. A difference from FIG. 1 is that the local oscillation wave generating circuit 10 includes three local oscillators.

Figure 5A:
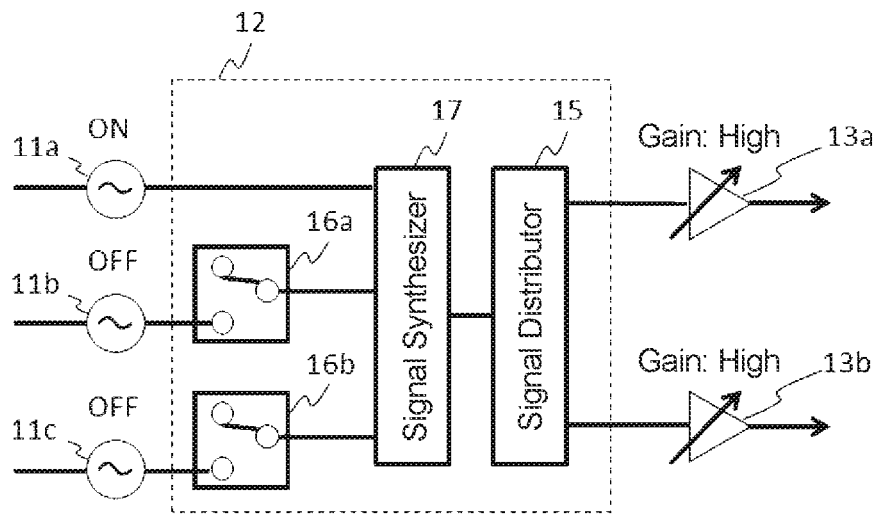
FIG. 5 is a diagram illustrating the state of a local oscillation wave generating circuit 10 included in the array antenna device according to the third embodiment of the present invention.
Figure 5B:
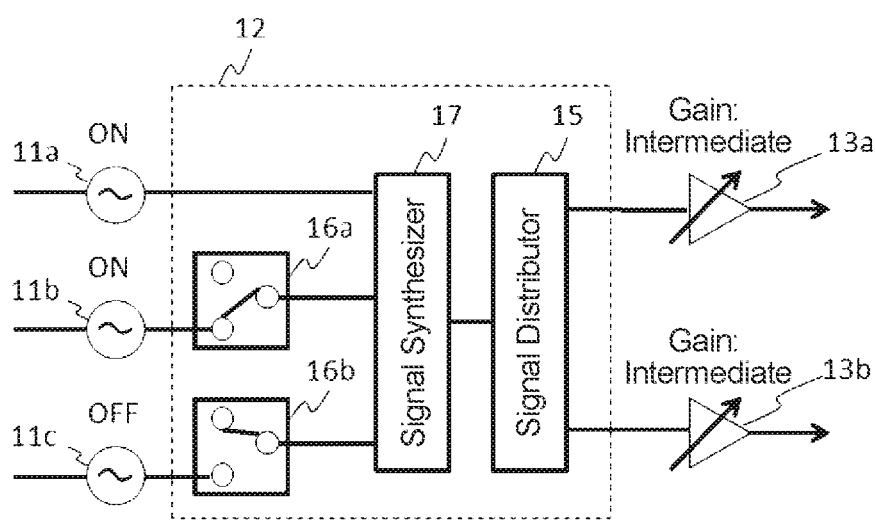
Figure 5C:
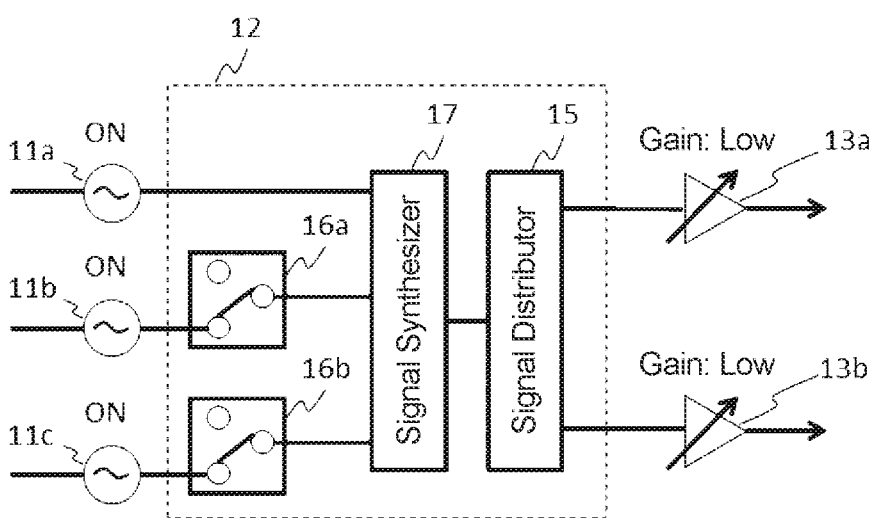

FIG. 5 is a diagram illustrating the state of the local oscillation wave generating circuit 10 included in the array antenna device according to the third embodiment of the present invention. In FIGS. 5A to 5C, the path switching circuit 12 includes switches 16a and 16b, a signal synthesizer 17, and a signal distributor 15.

FIG. 5A is a diagram illustrating one of the states of the local oscillation wave generating circuit 10. Of the local oscillators 11a to 11c, the local oscillator 11a is powered on, whereas the local oscillators 11b and 11c are powered off. The path switching circuit 12 causes both the switches 16a and 16b to be in an open state. The path switching circuit 12 outputs the local oscillation wave output from the local oscillator 11a to the variable gain amplifiers 13a and 13b via the signal synthesizer 17 and the signal distributor 15. The variable gain amplifiers 13a and 13b have gains higher than those in FIGS. 5B and 5C. The variable gain amplifiers 13a and 13b amplify the local oscillation waves output from the signal distributor 15 and output the amplified local oscillation waves to the mixers 4a and 4b.

The state illustrated in FIG. 5A is used in a case where the signal-to-noise ratio requirement is low. In this case, by outputting a local oscillation wave from the local oscillator 11a, it can suppress the power consumption for driving the local oscillators 11b and 11c while performing the operation with the minimum necessary signal-to-noise ratio.

FIG. 5B is a diagram illustrating one of the states of the local oscillation wave generating circuit 10. Of the local oscillators 11a to 11c, the local oscillator 11a and the local oscillator 11b are powered on, and the local oscillator 11c is powered off. The path switching circuit 12 switches the switch 16a to the local oscillator 11b side, and causes the switch 16b to be in an open state. The path switching circuit 12 synthesizes the local oscillation wave output from the local oscillator 11a and the local oscillation wave output from the local oscillator 11b via the switch 16a by the signal synthesizer 17, and then distributes the waves again by the signal distributor 15, and outputs the waves to the variable gain amplifiers 13a and 13b. The variable gain amplifiers 13a and 13b have gains higher than those in FIG. 5C but lower than those in FIG. 5A. The variable gain amplifiers 13a and 13b amplify the local oscillation waves output from the signal distributor 15 and output the amplified local oscillation waves to the mixers 4a and 4b.

The state illustrated in FIG. 5B is used in a case where the signal-to-noise ratio requirement is high. In this case, the local oscillators 11a and 11b each output local oscillation waves having random components in which signal components are the same in frequency and phase as each other but noise components are independent from each other, and thus the signal components are coherently synthesized whereas the noise components are incoherently synthesized. Therefore, the signal-to-noise ratio, which is a ratio of signal components to noise components of the local oscillation wave output from the signal synthesizer 17, can be improved by 3 dB as compared to the configuration in which a single local oscillator is used as illustrated in FIG. 5A. By inputting the local oscillation waves with the improved signal-to-noise ratio to the mixers 4a and 4b, the signal-to-noise ratio, which is a ratio of signal components to noise components obtained after the reception digital signals output from the ADCs 7a and 7b are integrated by the signal processing circuit 8, can be improved by 3 dB as compared to a configuration in which a single local oscillator is used as illustrated in FIG. 5A. Moreover, the power consumption for driving the local oscillator 11c can be suppressed.

FIG. 5C is a diagram illustrating one of the states of the local oscillation wave generating circuit 10. All of the local oscillators 11a to 11c are powered on. The path switching circuit 12 switches both the switches 16a and 16b to the local oscillator 11b side. The path switching circuit 12 synthesizes the local oscillation wave output from the local oscillator 11a, the local oscillation wave output from the local oscillator 11b via the switch 16a, and the local oscillation wave output from the local oscillator 11c via the switch 16b by the signal synthesizer 17, and then distributes the waves again by the signal distributor 15, and outputs the waves to the variable gain amplifiers 13a and 13b. The variable gain amplifiers 13a and 13b have gains higher than those in FIGS. 5A and 5B. The variable gain amplifiers 13a and 13b amplify the local oscillation waves output from the signal distributor 15 and output the amplified local oscillation waves to the mixers 4a and 4b.

The state illustrated in FIG. 5C can be used in a case where the signal-to-noise ratio requirement is even higher than the state illustrated in FIG. 5B. In this case, the local oscillators 11a, 11b, and 11c each output local oscillation waves having random components in which signal components are the same in frequency and phase as each other but noise components are independent from each other, and thus the signal components are coherently synthesized, whereas the noise components are incoherently synthesized. Therefore, the signal-to-noise ratio, which is a ratio of signal components to noise components of the local oscillation wave output from the signal synthesizer 17, can be further improved by 2 dB as compared to the configuration in which two single local oscillators are used as illustrated in FIG. 5B. By inputting the local oscillation waves with the improved signal-to-noise ratio to the mixers 4a and 4b, the signal-to-noise ratio, which is a ratio of signal components to noise components obtained after the reception digital signals output from the ADCs 7a and 7b are integrated by the signal processing circuit 8, can be improved by 2 dB as compared to a configuration in which two single local oscillators are used as illustrated in FIG. 5B.

Figure 6A:
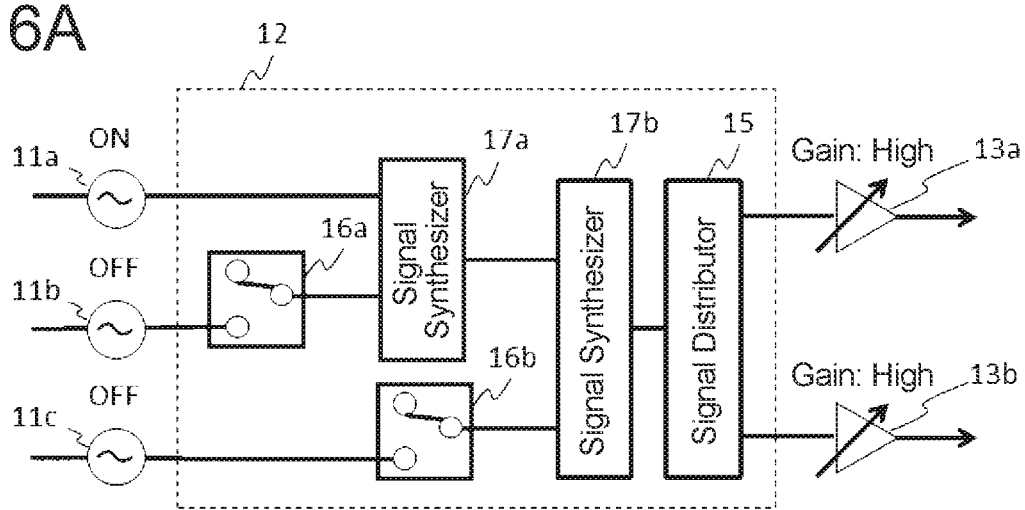
FIG. 6 is a diagram illustrating the state of a local oscillation wave generating circuit 10 of another exemplary configuration included in the array antenna device according to the third embodiment of the present invention.
Figure 6B:
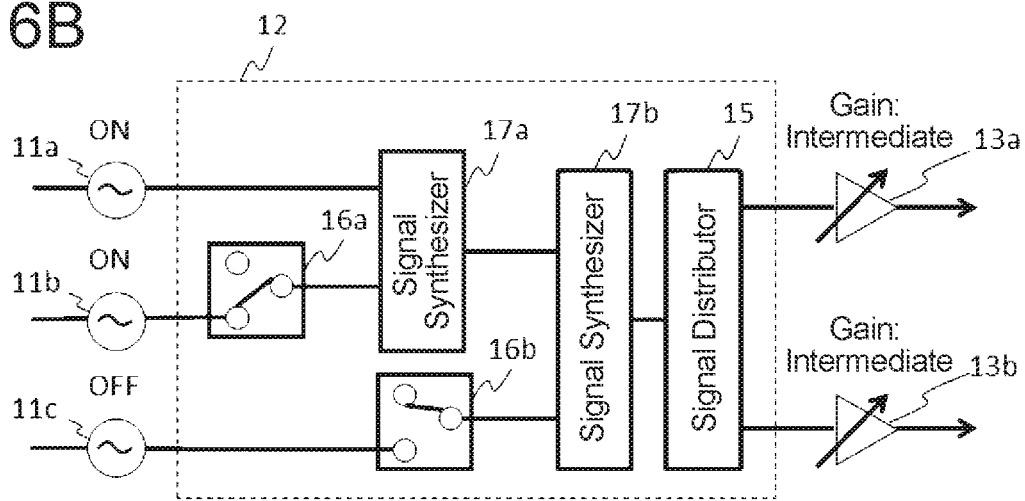
Figure 6C:
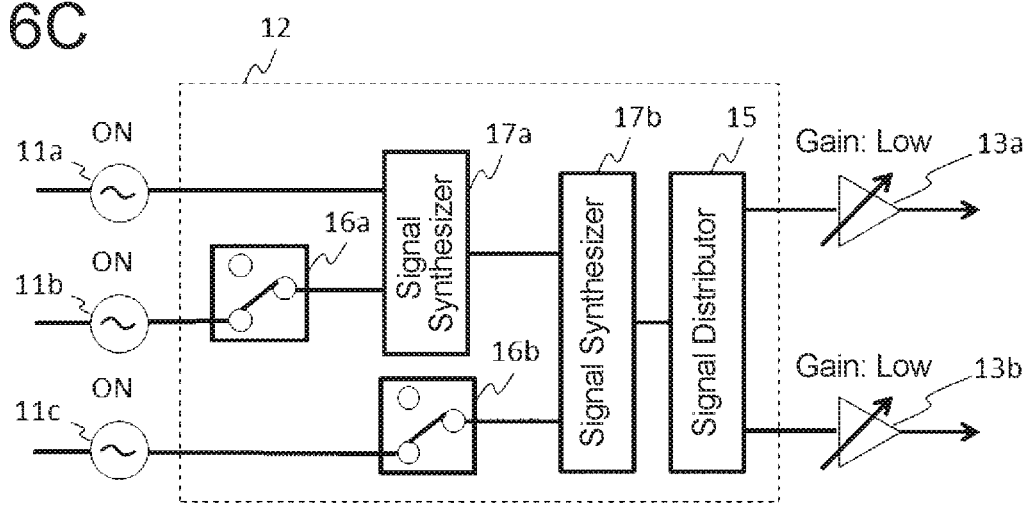

Similar effects can be obtained by using circuits of FIGS. 6A to 6C illustrated below instead of those of FIGS. 5A to 5C.

FIG. 6 is a diagram illustrating the state of a local oscillation wave generating circuit 10 of another exemplary configuration included in the array antenna device according to the third embodiment of the present invention. In FIGS. 6A to 6C, the path switching circuit 12 includes switches 16a and 16b, signal synthesizers 17a and 17b, and a signal distributor 15.

FIG. 6A is a diagram illustrating the state of the local oscillation wave generating circuit 10 corresponding to FIG. 5A. Of the local oscillators 11a to 11c, the local oscillator 11a is powered on, whereas the local oscillators 11b and 11c are powered off. The path switching circuit 12 causes both the switches 16a and 16b to be in an open state. The path switching circuit 12 outputs local oscillation waves output from a local oscillator 11a to variable gain amplifiers 13a and 13b via the signal synthesizers 17a and 17b and the signal distributor 15. The variable gain amplifiers 13a and 13b have gains higher than those in FIGS. 6B and 6C. The variable gain amplifiers 13a and 13b amplify the local oscillation waves output from the signal distributor 15 and output the amplified local oscillation waves to the mixers 4a and 4b.

FIG. 6B is a diagram illustrating the state of the local oscillation wave generating circuit 10 corresponding to FIG. 5B. Of the local oscillators 11a to 11c, the local oscillator 11a and the local oscillator 11b are powered on, and the local oscillator 11c is powered off. The path switching circuit 12 switches the switch 16a to the local oscillator 11b side, and causes the switch 16b to be in an open state. The path switching circuit 12 synthesizes the local oscillation wave output from the local oscillator 11a and the local oscillation wave output from the local oscillator 11b via the switch 16a by the signal synthesizer 17a, distributes the waves again by the signal distributor 15 after the wave passes through the signal synthesizer 17b, and outputs the waves to the variable gain amplifiers 13a and 13b. The variable gain amplifiers 13a and 13b have gains higher than those in FIG. 6C but lower than those in FIG. 6A. The variable gain amplifiers 13a and 13b amplify the local oscillation waves output from the signal distributor 15 and output the amplified local oscillation waves to the mixers 4a and 4b.

FIG. 6C is a diagram illustrating the state of the local oscillation wave generating circuit 10 corresponding to FIG. 5C. All of the local oscillators 11a to 11c are powered on. The path switching circuit 12 switches both the switches 16a and 16b to the local oscillator 11b side. The path switching circuit 12 synthesizes the local oscillation wave output from the local oscillator 11a and the local oscillation wave output from the local oscillator 11b via the switch 16a by the signal synthesizer 17a, and then synthesizes the wave with the local oscillation wave output from the local oscillator 11c via the switch 16b by the signal synthesizer 17b, distributes the waves again by the signal distributor 15, and outputs the waves to the variable gain amplifiers 13a and 13b. The variable gain amplifiers 13a and 13b have gains higher than those in FIGS. 6A and 6B. The variable gain amplifiers 13a and 13b amplify the local oscillation waves output from the signal distributor 15 and output the amplified local oscillation waves to the mixers 4a and 4b.

Next, a procedure for switching the state of the local oscillation wave generating circuit 10 illustrated in FIG. 6 will be described.

First, it is assumed that the local oscillation wave generating circuit 10 is in the state of FIG. 6C. In a case where a target signal-to-noise ratio is satisfied as a final processing result by the signal processing circuit 8 of a pilot signal received by the antennas 1a and 1b, the signal processing circuit 8 outputs a state switching signal for switching from the state of FIG. 5C to the state of FIG. 5B to the control signal generating circuit 14.

The control signal generating circuit 14 outputs a power control signal, a path control signal, and a gain control signal to the local oscillators 11a, 11b, and 11c, the path switching circuit 12, and the variable gain amplifier 13, respectively, to switch the state from the state of 6C to the state of FIG. 6B.

In the state illustrated in FIG. 6B, in a case where a target signal-to-noise ratio is satisfied as a final processing result by the signal processing circuit 8 of a pilot signal received by the antennas 1a and 1b, the signal processing circuit 8 outputs a state switching signal for switching from the state of FIG. 6B to the state of FIG. 6A to the control signal generating circuit 14.

The control signal generating circuit 14 outputs a power control signal, a path control signal, and a gain control signal to the local oscillators 11a, 11b, and 11c, the path switching circuit 12, and the variable gain amplifier 13, respectively, to switch the state from the state of 6B to the state of FIG. 6A.

Conversely, when the target signal-to-noise ratio is not satisfied, a state switching signal for returning to the state of FIG. 6C from the state of FIG. 6B is output to the control signal generating circuit 14, and the communication is started while the state of FIG. 6C is maintained thereafter.

In the state of FIG. 6A, in a case where a target signal-to-noise ratio is satisfied as a final processing result by the signal processing circuit 8 of a pilot signal received by the antennas 1a and 1b, the state of FIG. 6A is maintained, and the communication is started after causing the array antenna device to operate in a low power consumption state.

Conversely, when the target signal-to-noise ratio is not satisfied, a state switching signal for returning to the state of FIG. 5B again from the state of FIG. 6A is output to the control signal generating circuit 14, and the communication is started while the state of FIG. 6B is maintained thereafter.

As described above, according to the third embodiment, more local oscillators 11a, 11b, and 11c than the antennas 1a and 1b are arranged, and the ON/OFF of the local oscillators 11a, 11b, and 11c, the output destination of the local oscillation waves output from the local oscillators 11a, 11b, and 11c, and the gains of the variable gain amplifiers 13a and 13b included in the local oscillation wave generating circuit 10 are changed on the basis of the signal-to-noise ratio requirement. Therefore, the power consumption of the local oscillation wave generating circuit 10 can be changed on the basis of a change in the signal-to-noise ratio requirement, which enables implementation of the state of a local oscillation wave generating circuit for high-speed communication with a higher signal-to-noise ratio requirement.

Note that in the above description the case of two antennas (antennas 1a and 1b) for receiving signals has been described; however, N antennas may be used. In a case where N antennas are used, by arranging N+1 or more local oscillators, the state of the local oscillation wave generating circuit for high-speed communication with a higher signal-to-noise ratio requirement can be implemented.

In the above description, although the cases where the local oscillation wave generating circuit 10 illustrated in FIGS. 5 and 6 is applied to a receiver has been described; however, similar effects can be obtained from application to a transmitter.

REFERENCE SIGNS LIST 1a and 1b: antenna,
1c and 1d: transmission antenna,
2a and 2b: low-noise amplifier,
2c and 2d: high-power amplifier,
3a, 3b, 3c, and 3d: filter,
4a, 4b, 4c, 4d: mixer,
5a, 5b, 5c, 5d: filter,
6a, 6b, 6c, 6d: amplifier,
7a, 7b: ADC,
7c, 7d: DAC,
8: signal processing circuit,
9: reference oscillator,
10: local oscillation wave generating circuit,
11a, 11b, 11c: local oscillator,
12: path switching circuit,
13a, 13b: variable gain amplifier,
14: control signal generating circuit,
15: signal distributor,
16, 16a, 16b: switch,
17, 17a, 17b: signal synthesizer,
21: signal processing circuit,
25: receiving antenna, and
26: receiver

The invention claimed is:

1. A local oscillation device comprising:
a first local oscillator to output a first local oscillation wave synchronized with a reference signal, the first local oscillator being turned on/off on the basis of a control signal;
a second local oscillator to output a second local oscillation wave synchronized with the reference signal and the same in frequency and phase as the first local oscillation wave, the second local oscillator being turned on/off on the basis of the control signal; and
a path switching circuit coupled to the first local oscillator and the second local oscillator, the path switching circuit switching paths of the first local oscillation wave and the second local oscillation wave on the basis of the control signal or a signal synchronized with the control signal, wherein
the path switching circuit switches the paths so that the first local oscillation wave and the second local oscillation wave are output when the second local oscillator is ON, and so that the first local oscillation wave is distributed and output when the second local oscillator is OFF,
the path switching circuit includes:
a signal distributor including: a first input terminal coupled to the first local oscillator, a second input terminal, and an output terminal; and
a switch including: a first terminal coupled to the second local oscillator, a second terminal coupled to the second input terminal of the signal distributor, and a third terminal which is an output terminal, the switch switching a connection.

2. A local oscillation device comprising:
a first local oscillator to output a first local oscillation wave synchronized with a reference signal, the first local oscillator being turned on/off on the basis of a control signal;
a second local oscillator to output a second local oscillation wave synchronized with the reference signal and the same in frequency and phase as the first local oscillation wave, the second local oscillator being turned on/off on the basis of the control signal; and
a path switching circuit coupled to the first local oscillator and the second local oscillator, the path switching circuit switching paths of the first local oscillation wave and the second local oscillation wave on the basis of the control signal or a signal synchronized with the control signal, wherein
the path switching circuit switches the paths so that the first local oscillation wave and the second local oscillation wave are output when the second local oscillator is ON, and so that the first local oscillation wave is distributed and output when the second local oscillator is OFF,
the path switching circuit includes:
a signal synthesizer coupled to the first local oscillator, the signal synthesizer synthesizing signals;
a switch coupled to the second local oscillator and the signal synthesizer, the switch switching a connection; and
a signal distributor coupled to an output terminal of the signal synthesizer, the signal distributor to distribute distributing an output signal of the signal synthesizer.

3. An array antenna device comprising:
a local oscillation device comprising:
a first local oscillator to output a first local oscillation wave synchronized with a reference signal, the first local oscillator being turned on/off on the basis of a control signal;
a second local oscillator to output a second local oscillation wave synchronized with the reference signal and the same in frequency and phase as the first local oscillation wave, and the second local oscillator being turned on/off on the basis of the control signal; and
a path switching circuit coupled to the first local oscillator and the second local oscillator, the path switching circuit switching paths of the first local oscillation wave and the second local oscillation wave on the basis of the control signal or a signal synchronized with the control signal;
a first antenna to receive a first reception signal;
a second antenna to receive a second reception signal;
a first mixer to mix the first reception signal and the first local oscillation wave or the second local oscillation wave output from the local oscillation device, and to output a first mixed wave;
a second mixer to mix the second reception signal and the first local oscillation wave or the second local oscillation wave output from the local oscillation device, and to output a second mixed wave;
a first analog-to-digital converter to convert the first mixed wave into a first digital signal;
a second analog-to-digital converter to convert the second mixed wave into a second digital signal;
a signal processing circuit to process the first digital signal and the second digital signal, and to calculate noise characteristics of the first reception signal and the second reception signal; and
a control signal generating circuit to output the control signal to the first local oscillator and the second local oscillator, and to output the control signal or a signal synchronized with the control signal on the basis of the noise characteristics calculated by the signal processing circuit.

4. An array antenna device comprising:
a local oscillation device comprising:
a first local oscillator to output a first local oscillation wave synchronized with a reference signal, the first local oscillator being turned on/off on the basis of a control signal;
a second local oscillator to output a second local oscillation wave synchronized with the reference signal and the same in frequency and phase as the first local oscillation wave, and the second local oscillator being turned on/off on the basis of the control signal; and
a path switching circuit coupled to the first local oscillator and the second local oscillator, the path switching circuit switching paths of the first local oscillation wave and the second local oscillation wave on the basis of the control signal or a signal synchronized with the control signal;
a signal processing circuit to output a digital signal;
a control signal generating circuit to output the control signal to the first local oscillator and the second local oscillator, and to output the control signal or a signal synchronized with the control signal on the basis of a noise characteristic of the digital signal output by the signal processing circuit;
a first digital-to-analog converter to convert the digital signal into a first analog signal;
a second digital-to-analog converter to convert the digital signal into a second analog signal;
a first mixer to mix the first analog signal and the first local oscillation wave or the second local oscillation wave output from the local oscillation device, and to output a first mixed wave;
a second mixer to mix the second analog signal and the first local oscillation wave or the second local oscillation wave output from the local oscillation device, and to output a second mixed wave;
a first antenna to transmit the first mixed wave; and
a second antenna to transmit the second mixed wave.

5. The array antenna device according to claim 4, further comprising:
a receiving antenna to receive a response signal to a pilot signal output from the signal processing circuit; and
a receiver to convert a frequency of the response signal, wherein the signal processing circuit receives the response signal a frequency of which is converted and controls the control signal generating circuit on the basis of a reception result.

* * * * *